United States Patent

Mitsumine et al.

[11] Patent Number: 5,818,420
[45] Date of Patent: Oct. 6, 1998

[54] 3D OBJECT GRAPHICS DISPLAY DEVICE, 3D OBJECT GRAPHICS DISPLAY METHOD, AND MANIPULATOR FOR 3D OBJECT GRAPHICS DISPLAY

[75] Inventors: Hideki Mitsumine; Yuichi Ninomiya; Kazumasa Enami; Hideo Noguchi; Seiki Inoue; Tadoru Kato, all of Tokyo; Kunihiko Hontani, Kadoma; Masao Fujiwara, Tokyo, all of Japan

[73] Assignees: Nippon Hoso Kyokai, Tokyo; Matsushita Electric Industrial Co., Ltd., Osaka; NHK Engineering Services, Inc., Tokyo, all of Japan

[21] Appl. No.: 733,599

[22] Filed: Oct. 18, 1996

Related U.S. Application Data

[63] Continuation of Ser. No. 691,813, Jul. 31, 1996.

[51] Int. Cl.[6] .................................................. G06T 17/40
[52] U.S. Cl. ...................... 345/156; 345/126; 345/133; 345/161; 345/167; 395/119; 395/125; 395/133
[58] Field of Search ...................... 345/31, 156, 158, 345/202, 173, 161, 167, 126, 133; 395/119, 121, 125, 130, 133–139

[56] References Cited

U.S. PATENT DOCUMENTS

| | | | |
|---|---|---|---|
| 5,103,217 | 4/1992 | Cawley | 395/129 |
| 5,132,672 | 7/1992 | Clark | 340/710 |
| 5,313,230 | 5/1994 | Venolia et al. | 345/163 |
| 5,422,987 | 6/1995 | Yameda | 395/127 |
| 5,513,020 | 4/1996 | Kalo et al. | 359/9 |
| 5,537,224 | 7/1996 | Suzuuki et al. | 358/448 |
| 5,577,960 | 11/1996 | Sasaki | 395/152 |
| 5,588,098 | 12/1996 | Chen et al. | 395/133 |

Primary Examiner—Steven Saras
Assistant Examiner—Vincent E. Kovalick
Attorney, Agent, or Firm—Spencer & Frank

[57] ABSTRACT

A 3D object graphics display device for storing information about 3D objects such as works of art or buildings, and for displaying them on a 2D display. The "3D shape data" and "texture data" of a 3D object is stored in a memory in advance. When an operator operates a manipulator, a 2D image is generated, which would be acquired when the 3D object is seen from a viewpoint indicated by the manipulator, by using the 3D shape data and the texture data in every 1/60 sec or less interval (that is, a minimum display interval of the display device). The 2D image is shown on the display, giving the operator a virtual-reality-like feeling as if he was actually holding the 3D object.

14 Claims, 14 Drawing Sheets

3D OBJECT GRAPHICS DISPLAY DEVICE, 3D OBJECT GRAPHICS DISPLAY METHOD, AND MANIPULATOR FOR 3D OBJECT GRAPHICS DISPLAY

This application is a continuing application of Ser. No. 08/691,813, filed Jul. 31, 1996.

BACKGROUND OF THE INVENTION

1. Field of the Invention

The present invention relates to a 3D (three-dimensional) object graphics display device, 3D object graphics display method, and a manipulator for use with a 3D object graphics display, and more particularly to a 3D object graphics display device and method for carrying out a two-dimensional display by performing a desired image processing on prestored 3D object image data. Furthermore, the present invention relates to a manipulator for converting a manipulated variable into length and angle information to be output as electric signals. In particular, the present invention relates to a 3D object graphics display device, 3D object graphics display method and a 3D object graphics manipulator suitable for displaying 3D object images on a two-dimensional display device by freely combining the images seen from a desired viewpoint of an operator.

2. Description of Related Art

A conventional 3D object graphics display technique is known which displays two-dimensional images selected by an operator from a plurality of two-dimensional images of a 3D art object, for example, which have been acquired from various viewpoints and stored in a database, thereby forming an image of the art object seen from a desired viewpoint.

Another conventional 3D object graphics display technique is known which displays motion pictures using a VTR. It displays images reproduced from a video tape which records pictures of a 3D object taken from various viewpoints (or by moving the 3D object using a turn table or the like).

However, the former system, which displays selected 3D object graphics images in accordance with the instructions of the operator, has a problem in that the amount of image data to be stored in advance becomes enormous.

On the other hand, the latter system, which displays motion pictures using a VTR has a problem in that it lacks interaction between the system and an operator.

A conventional manipulator is used, for example, to move an image displayed on a display device such as a CRT. It generates information for moving a desired image on the display device in response to the manipulation of a positioning operation portion by an operator.

Joysticks and trackballs are known as typical manipulators of this type.

FIG. 1 shows a structure of a joystick. The joystick has a second degree of freedom. When an operator manipulates a positioning operation portion (stick) 53, two rotary encoders 51 and 52, whose axes for detecting angles are perpendicularly disposed in such a fashion that they are linked to the stick 53, detect the angles and output angle information.

FIG. 2 shows a structure of a trackball. The trackball also has a second degree of freedom. When an operator manipulates a manual positioning portion (ball) 54, two rotary encoders 55 and 56, whose axes for detecting angles are perpendicularly disposed in such a fashion that their detection portions make contact with the ball 54, detect the angles and output angle information.

When the joystick and trackball are used, however, it is difficult to handle a case where a device receiving the angle information inhibits the input of the angle information outside predetermined angles or a predetermined angle range. Specifically, since the joystick and trackball have positioning operation portions that can be moved freely within variable ranges allowed by the degrees of freedom, it is difficult using the joystick, or extremely difficult using the trackball, to provide angle information such as scale marks. For this reason, using either the joystick or trackball, it is difficult for the operator even with considerable care to manipulate the positioning operation portion such that it does not enter the inhibited angle and angle region.

In addition, when an operator tries to move a 3D object displayed on a display device by operating a manipulator, it is difficult for the operator to feel as through he is holding the 3D object in his hand by using the joystick, or to feel that he is grasping the 3D object by using the trackball. This is because the positioning operation portion of the joystick can be moved only in a limited range with respect to the joint portion which makes possible the free manipulation of the positioning operation portion, and because the positioning operation portion the trackball is manipulated with only the feeling of rolling the ball.

SUMMARY OF THE INVENTION

Therefore, a first object of the present invention to provide a 3D object graphics display device and a 3D object graphics display method capable of implementing a 3D object graphics display in a virtual-reality-like, interactive manner while limiting the amount of data to be stored as 3D object graphics image data.

A second object of the present invention is to provide a 3D object graphics display device and a 3D object graphics display method capable of implementing an image display which provides an operator with a feeling as if he is watching a 3D object that really exists, and is actually moving it with his hand, by freely combining the 3D object graphics images in accordance with viewpoint information fed from a manipulator.

A third object of the present invention is to provide a manipulator which can limit the manipulable range of a positioning operation portion to a desired operation range defined in advance within the physically variable range of the positioning operation portion.

A fourth object of the present invention is to offer a manipulator which can provide the positioning operation portion with a desired braking force in the manipulable range.

A fifth object of the present invention is to offer a manipulator which can provide an operator with a feeling as if he is holding a 3D object displayed on a display device.

To accomplish the objects, in a first aspect of the present invention, there is provided a 3D (three-dimensional) object graphics display device for displaying a 2D (two-dimensional) graphic image by performing image processing on prestored 3D object image data, the 3D object graphics display device comprising:

a manipulator for outputting position information, the manipulator having a two or more degrees of freedom, allowing free rotation; and calculation processing means for generating, when the manipulator indicates a reference position, a 2D image of a 3D object seen from a particular viewpoint, and for generating, when the manipulator points a position apart from the reference position by a displacement amount, a 2D image of the 3D object seen from a viewpoint shifted by an amount corresponding to the displacement amount, the generating being carried out on the basis of 3D shape data and texture data of the 3D object, which are prestored in a storage as the 3D object image data.

Here, the manipulator may comprise: a fixed portion; a positioning operation portion mounted on the fixed portion, the positioning operation portion having two or more degrees of freedom, and being displaced by an external force; and two or more converters each provided in correspondence with each one of the degrees of freedom, for converting displacement amounts on respective axes corresponding to the degrees of freedom into displacement amounts in terms of length or angle, and for outputting the displacement amounts in a form of electric signals.

The calculation processing means may iterate the image generating at every 1/60 sec which is a minimum display interval, and may complete a display on a 2D display within 1/60 sec from a beginning of the image generating.

According to a second aspect of the present invention, there is provided a 3D (three-dimensional) object graphics display method for displaying an image on a 2D (two-dimensional) display by performing image processing on image data prestored in a storage, the 3D object graphics display method comprising the steps of:

generating, when a manipulator indicates a reference position, a 2D image of a 3D object seen from a particular viewpoint, and for generating, when the manipulator points to a position apart from the reference position by a displacement amount, a 2D image of the 3D object seen from a viewpoint shifted by an amount corresponding to the displacement amount, the generating being carried out by using 3D shape data and texture data of the 3D object, which are prestored in the storage as the 3D object image data, the manipulator including a positioning operation portion mounted on a fixed portion, and two or more converters, the positioning operation portion having two or more degrees of freedom, and being displaced by an external force, and the two or more converters being each provided in correspondence with each one of the degrees of freedom, for converting displacement amounts on respective axes corresponding to the degrees of freedom into displacement amounts in terms of length or angle to be output in the form of electric signals;

iterating the image generating in response to position information of the positioning operation portion at every 1/60 sec; and completing a display on the 2D display within 1/60 sec from a beginning of the image generating.

The present invention can achieve object graphics display which provides an operator with a feeling as if he were holding an actual object while operating a manipulator whose operation portion mounted on a fixed portion has at least a second degree of freedom, and which outputs its displacement in terms of a length or angle information, thereby enabling the 2D display to display the image of the 3D object seen from an angle corresponding to the position input through the manipulator (the position indicating the viewpoint) by generating the "3D shape data of the 3D object" and the "texture data of the 3D object" prestored in a memory device.

In other words, the present invention is characterized in that it displays the 2D image of the 3D object by generating in a short period of time the 3D shape data and the texture data of the 3D object prestored in the storage, while using the position data fed from the manipulator as parameters.

Furthermore, since the present invention iterates the image generating at every 1/60 sec (which is a minimum display interval), and completes the display on the 2D display within 1/60 sec from the beginning of the image generating, it can achieve the image display while providing an operator with a feeling as if he were holding the actual object.

According to a third aspect of the present invention, there is provided a manipulator including a positioning operation portion which is mounted on a fixed portion, is displaced by an external force, and has two or more degrees of freedom, the manipulator further including two or more converters each provided in correspondence with each one of the degrees of freedom, for converting displacement amounts on respective axes corresponding to the degrees of freedom into displacement amounts in terms of length or angle, and for outputting the displacement amounts in the form of electric signals, the manipulator comprising:

comparing means for comparing a predetermined range with a position indicated by the positioning operation portion, the predetermined range being set in advance within a physically operable range of the positioning operation portion, and the position indicated by the positioning operation portion being calculated from the electric signals representative of the displacement amounts;

a plurality of electromagnetic brakes for limiting an operable range of the positioning operation portion to within the predetermined range in response to an output of the comparing means;

external force detecting means for detecting the direction of the external force exerted on the positioning operation portion when the electromagnetic brakes are locked; and an electromagnetic brake controller for electrically locking the electromagnetic brakes at least on a border of the predetermined range, and for releasing the lock of the electromagnetic brakes when the external force exerted on the positioning operation portion is directed towards an inside of the predetermined range.

In the foregoing manipulator, the positioning operation portion may be connected to the converters, and be coupled with the electromagnetic brakes with a backlash being provided at coupling portions, the backlash being equal to or greater than resolution of the converters, thereby enabling the converters to function as the external force detecting means, as well.

Furthermore, the electromagnetic brake controller may comprise control means for increasing the braking force of the electromagnetic brakes as the position indicated by the positioning operation portion approaches the border of the predetermined range, within a fixed range near the border, and for locking the electromagnetic brakes electrically on the border of the predetermined range.

The electromagnetic brake controller may comprise control means for causing the electromagnetic brakes to generate at least a fixed braking force over an entire region of the predetermined range.

The electromagnetic brake controller may comprise control means for causing the electromagnetic brakes to generate a braking force in inverse proportion to an acceleration of the positioning operation portion, the acceleration being calculated from the electric signals representing displacement amounts in terms of a length or angle within the entire region of the predetermined range.

The positioning operation portion may comprise a spherical shape which rotates about a center of a sphere of 10–30 cm in diameter.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 1:
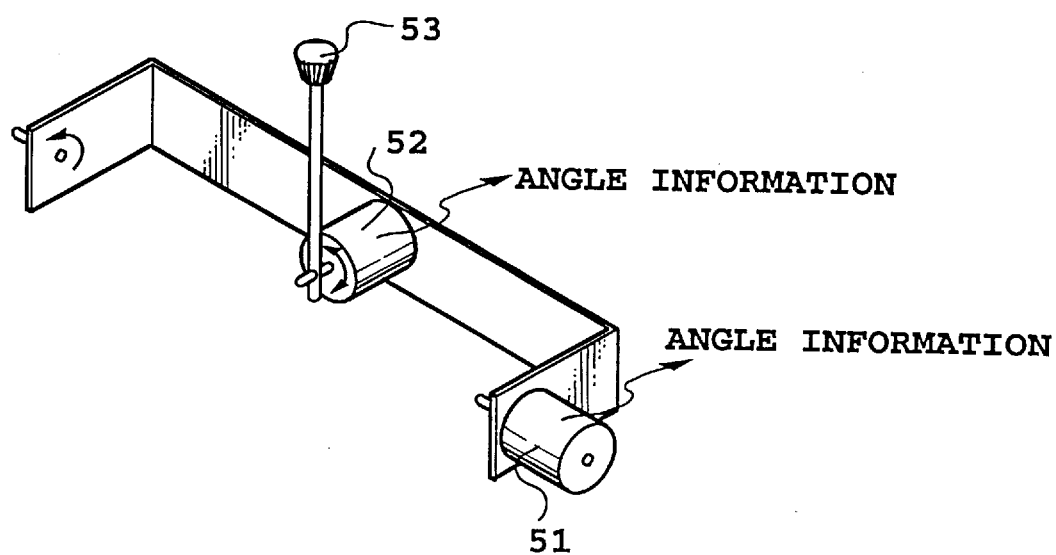
FIG. 1 is a perspective view illustrating a conventional joystick.
Figure 2:
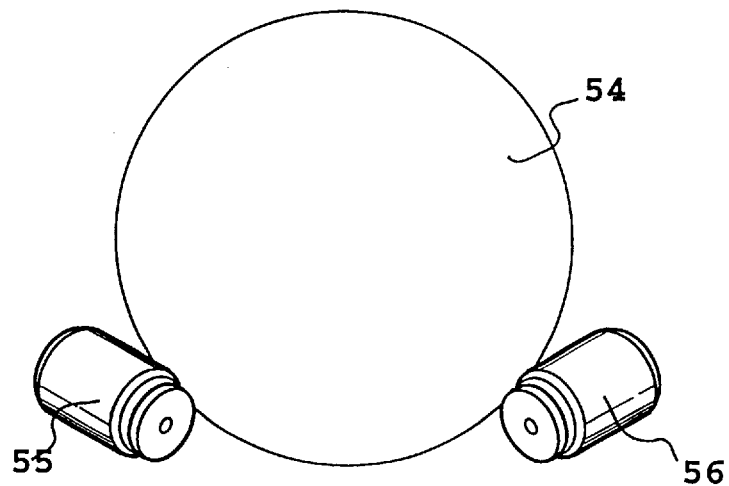
FIG. 2 is a perspective view illustrating a conventional trackball.
Figure 3:
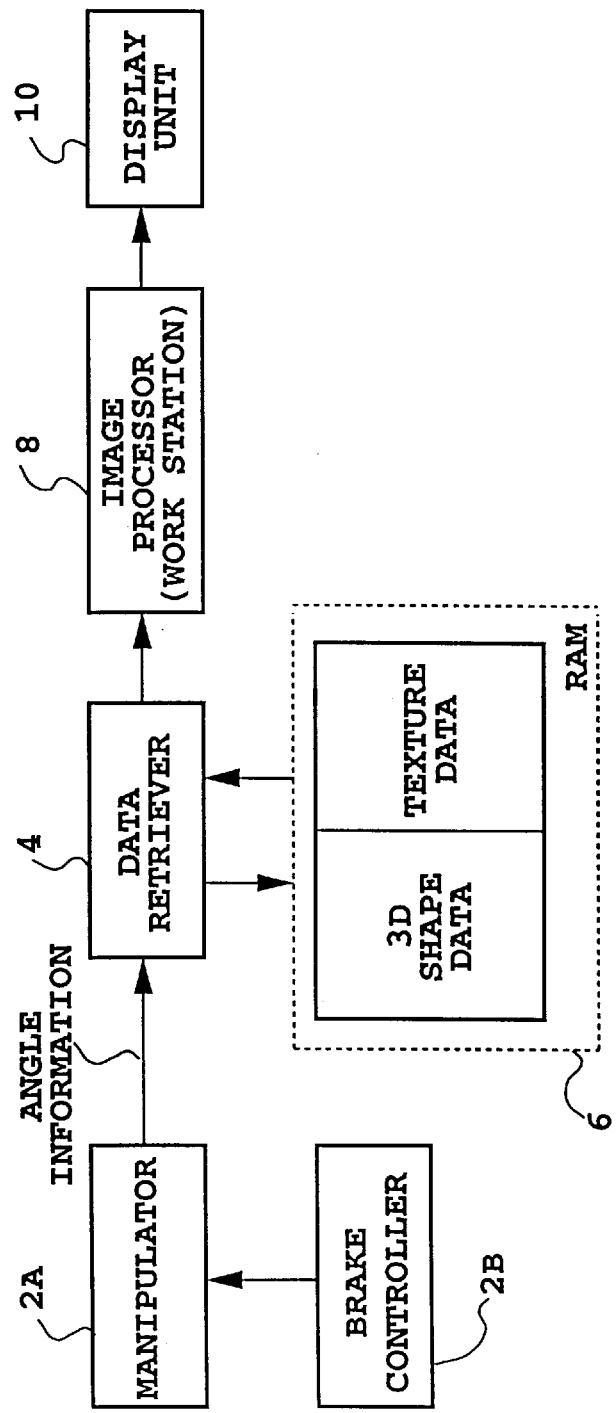
FIG. 3 is a block diagram showing the entire configuration of an embodiment of a 3D object graphics display system to which the present invention is applied.

FIG. 3 shows the entire configuration of an embodiment of a 3D object graphics display system in accordance with the present invention.

In this figure, the reference numeral 2A designates a manipulator with rotational characteristics of two or more degrees of freedom. The viewpoint of a 3D object image to be displayed can be set freely as an operator desires. The manipulator 2A includes rotary encoders which output angle data as position information (this will be described in more detail with reference to FIG. 4). With these rotary encoders, electromagnetic brakes (see FIG. 4) are coupled coaxially, thereby preventing the viewpoints from moving to a position corresponding to a portion of the 3D object image that cannot be displayed.

Figure 4:
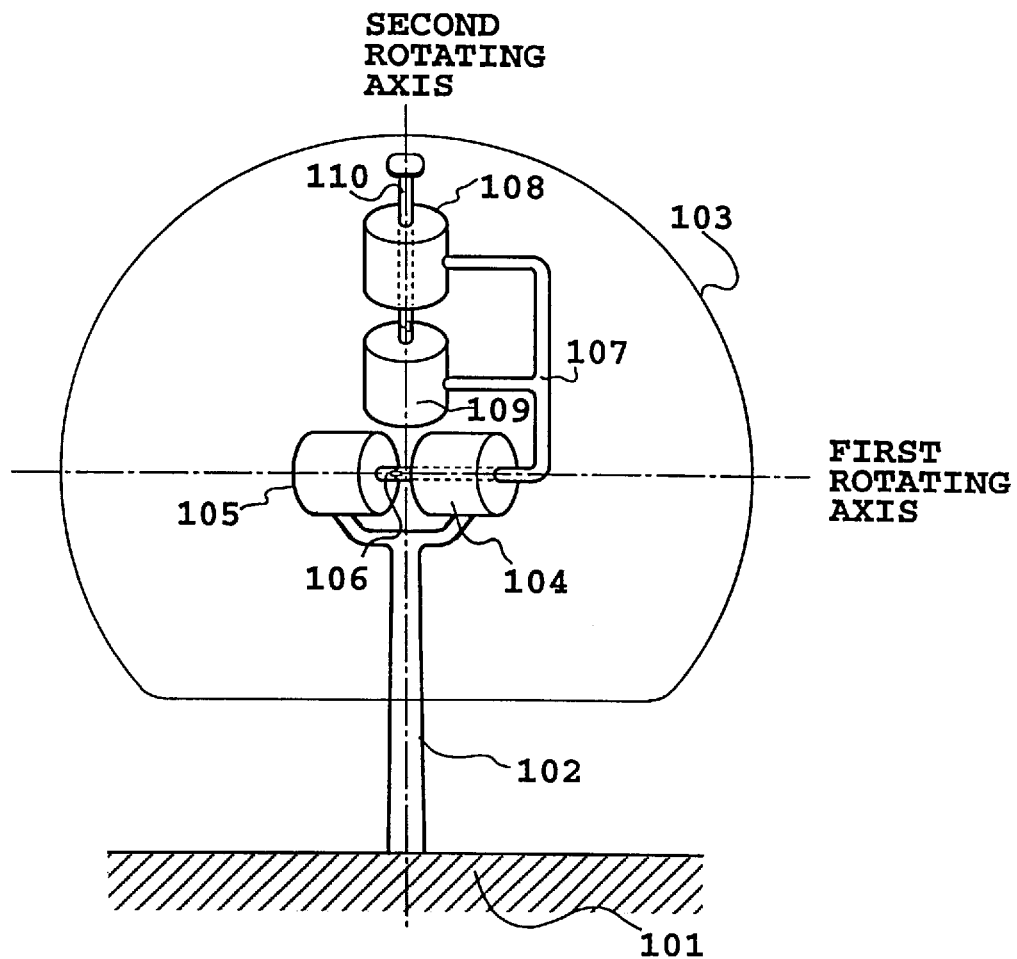
FIG. 4 is a perspective view showing the structure of the manipulator of FIG. 3 in more detail.

As is generally known, the manipulator 2A provides angle information when an operator manipulates a positioning operation portion of a spherical shape in this embodiment (see, 103 of FIG. 4). More specifically, the manipulator 2A acquires the angle data from the rotary encoders, although it may also be possible to obtain the angle information by reading the resistance of a potentiometer. In addition, since it is impossible to acquire the 3D shape and texture data of the bottom of a 3D object, an image thereof which includes the bottom cannot be displayed. Considering this, the electromagnetic brakes prevents the rotary encoders from being rolled beyond a border across which the positioning operation portion 103 would designate the bottom of the 3D object. A brake controller 2B is provided for this purpose.

The reference numeral 4 designates a data retriever for obtaining information about the 3D object in accordance with the angle information from the manipulator 2A. More specifically, a memory 6 consisting of a semiconductor memory stores (1) 3D shape data of the 3D object and (2) texture data thereof, and the data retriever 4 retrieves these data corresponding to the angle information fed from the preceding stage manipulator 2A, thereby transferring the data to an image processor 8 at the next stage.

The image processor 8 generates a 2D (two-dimensional) image from the "3D shape data" and "texture data" of the 3D object obtained from the data retriever 4. More specifically, a work station capable of fast rendering in real time is used as the image processor 8 (see, Andrew S. Glassner, "3D COMPUTER GRAPHICS, A User's Guide for Artists and Designers", second edition, 1989, TAB BOOKS). The work station attaches the texture to the 3D shape fed from the preceding stage by using the texture mapping, a computer graphics technique (see the book of Glassner), thereby generating the 2D image.

The image processor 8 iterates the image synthesis every 1/60 sec. (the minimum display interval of the display), and completes displaying the image on the 2D display within 1/60 sec from the start of the image synthesis, thereby carrying out the image display while providing the operator with a feeling as if he was holding the actual object. Such operation can be achieved using a fast CG work station available at present. For example, "POWER ONYXRE-2" made by Silicon Graphics Co. can achieve rendering over 15,000 polygons per 1/60 sec. where one polygon refers to a processing of mapping a texture on a triangular surface in 3D space. Thus, the CG work station can generate 15,000 triangular surfaces in 1/60 sec, thereby enabling a 3D object to be arranged in the form of a 2D image. In other words, the 2D image can be generated from the 3D shape and texture in less than 1/60 sec unless the shape is exceptionally complex.

The reference numeral 10 designates a display unit which displays in a visible form the 2D image generated by the image processor 8. Although this embodiment uses a CRT as the display unit 10, other output terminals can also be used such as a printer for printing a 2D images seen from a desired viewpoint.

FIG. 4 shows the mechanical construction of the manipulator 2A. As shown in FIG. 4, an upright support 102 is fixed on a base 101, and a variable portion is mounted on the support 102. The positioning operation portion 103 of a spherical shape with its bottom open is provided such that it covers the variable portion. The variable portion includes two rotary encoders 104 and 108 which are rotatable in two axial directions, and two electromagnetic brakes 105 and 109 coupled to the revolving shafts of the rotary encoders. Although not shown in this figure, a slack generating mechanism and a pressure sensor are provided on each of the revolving shafts coupling the rotary encoders and the electromagnetic brakes.

Figure 5:
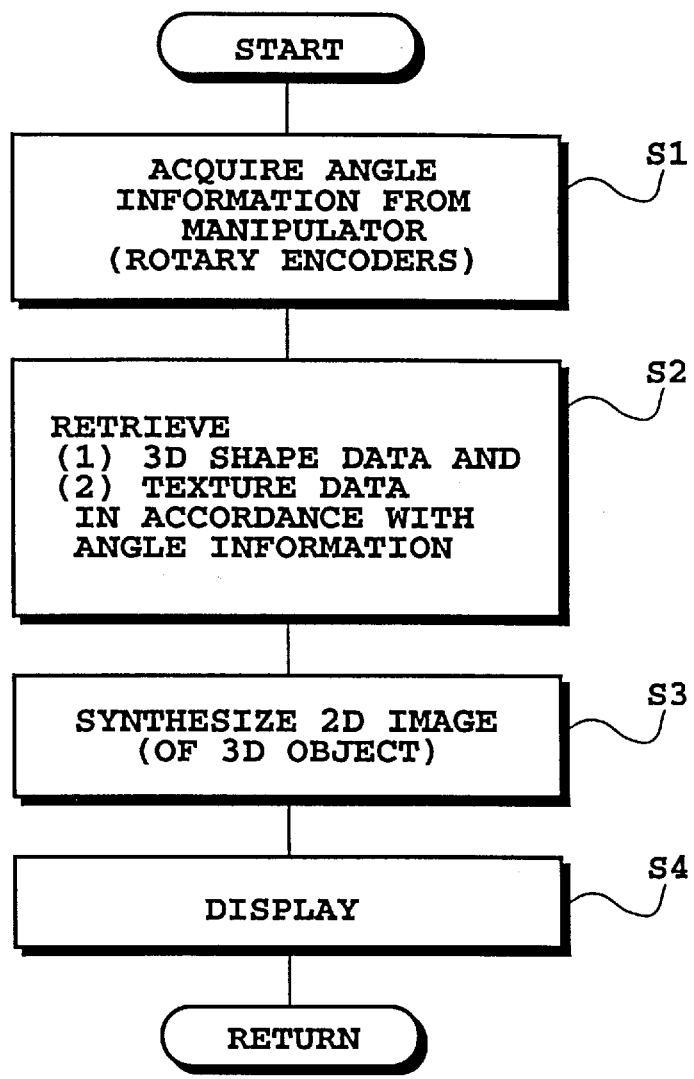
FIG. 5 is a flowchart illustrating a procedure for operating the display system of FIG. 3.

FIG. 5 is a flowchart illustrating a procedure for operating the display system. The operation of the display system will now be described with reference to FIGS. 5 and 3.

Step S1: Current angle information is acquired from the manipulator 2A. When the operator controls the manipulator, the angle information corresponding to the operation is obtained.

Step S2: Information about the 3D object corresponding to the angle information (that is, (1) 3D shape data and (2) texture data) is acquired from the data retriever 4.

Step S3: The information about the 3D object is input to the next stage, the image processor 8, which generates 2D images.

Step S4: The generated 2D images are displayed on the display unit 10.

The above-mentioned sequences S1–S4 are iterated every 1/60 sec. or less.

Next, details of the mechanical structure of the manipulator with a second degree of freedom in accordance with the present invention will be described.

A first rotary encoder 104 and a first electromagnetic brake 105 are fixed on the support 102 with their shafts coupled in a coaxial state. These shafts are kept horizontal, and form a first rotating axis 106.

The first rotating axis 106 is divided into a portion associated with the first rotary encoder 104 and a portion associated with the first electromagnetic brake 105, and the two portions are coupled with each other such that they allow rotation in reference to the other portion in a limited range. A supporting rod 107 is fixed on the first rotating axis 106 at the side of the first rotary encoder 104, and a second rotary encoder 108 and a second electromagnetic brake 109 are fixed with their revolving shafts coupled in a coaxial state. The revolving shafts are perpendicular to the first rotating axis, forming a second rotating axis 110. The first rotating axis 106 and the second rotating axis 110 are disposed such that they pass through the center of the sphere of the positioning operation portion 103.

The second rotating axis 110 is also composed of two portions like the first rotating axis 106. The top of the internal wall of the positioning operation portion 103 makes a contact with an end of the shaft 110 of the second rotary encoder 108. The positioning operation portion 103 has a diameter of about 10–30 cm.

With such an arrangement, the operator can rotate the positioning operation portion 103 by 360 degrees in a horizontal plane by holding it with two hands, in which case, the shafts of the second rotary encoder 108 and the second electromagnetic brake 109 rotate about the second rotating axis 110. In addition, the operator can to manually rotate the position operation portion 103 about the first rotating axis 106 until its bottom opening hits the support 102, in which case, the shafts of the first rotary encoder 104 and the first electromagnetic brake 105 rotate about the first axis 106.

The first rotary encoder 104 and the second rotary encoder 108 outputs pulse trains consisting of fixed numbers of pulses for every fixed rotation angle in response to the rotation of the first rotating axis 106 and the second rotating axis 110 respectively.

The first electromagnetic brake 105 and the second electromagnetic brake 109 brake or stop, i.e., lock the rotation of the first rotating axis 106 and the second rotating axis 110 respectively with electromagnetic forces in proportion to a control voltage supplied thereto.

Figure 6:
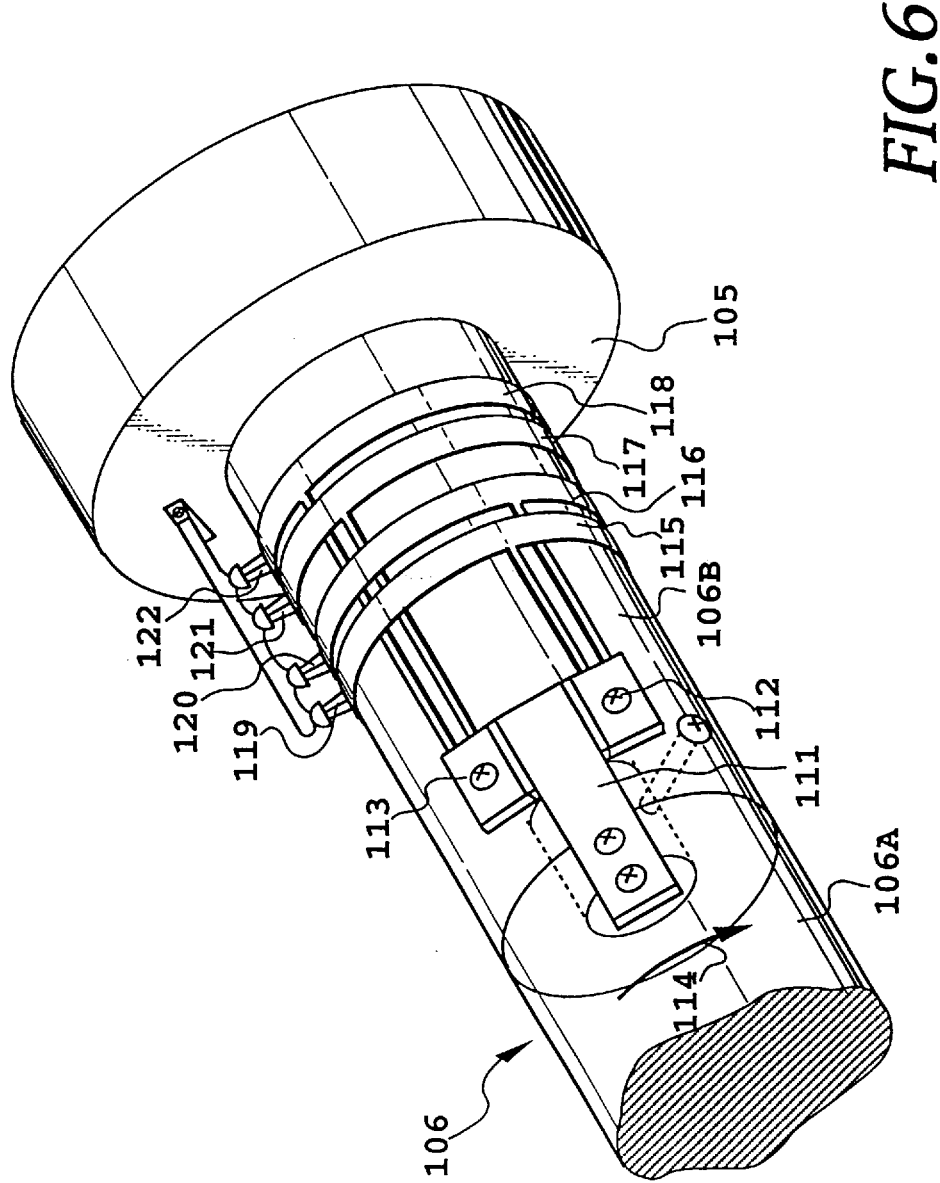
FIG. 6 is a perspective view showing a coupling portion of a first rotating axis.

FIG. 6 shows the construction of a coupling portion of the two divided portions of the first rotating axis 106 (and the second rotating axis 110). Specifically, the fixed end of a pressure actuator 111 is fixed at the end of the first rotating axis 106 at the side of the first rotary encoder 104, which is called a shaft 106A hereafter. The tip of the pressure actuator 111 extends to a portion of the first rotating axis 106 at the side of the first electromagnetic brake 105, which is called a shaft 106B hereafter. A pair of pressure sensors 112 and 113 are fixed on the shaft 106B in such a manner that they sandwich the pressure actuator 111 at both sides thereof strain gauges or piezo devices can be used as the pressure sensors.

With such an arrangement, the pressure sensor 112 detects the pressure when a predetermined pressure is applied thereon while the shaft 106A rotates in the direction of an arrow 114 in FIG. 6, with respect to the shaft 106B which is fixed by the first electromagnetic brake 105. Likewise, the pressure sensor 113 detects the pressure when the predetermined pressure is applied thereon while the shaft 106A rotates in the direction opposite to the arrow 114. The predetermined pressure is defined as an amount that the pressure sensors detect the pressure for the first time when a predetermined braking force is exerted by the electromagnetic brake 105 (109).

The detection signals output from the pair of pressure sensors 112 and 113 can be derived through four conducting rings 115–118, four conductive brushes 119–122, and leads (not shown) connected to the brushes 119–122, in which the conducting rings 115–118 are wound around the shaft 106B in an insulated state to lead the signals from the pressure sensors 112 and 113, and the conductive brushes 119–122 are fixed to the casing of the first electromagnetic brake 105.

Figure 7:
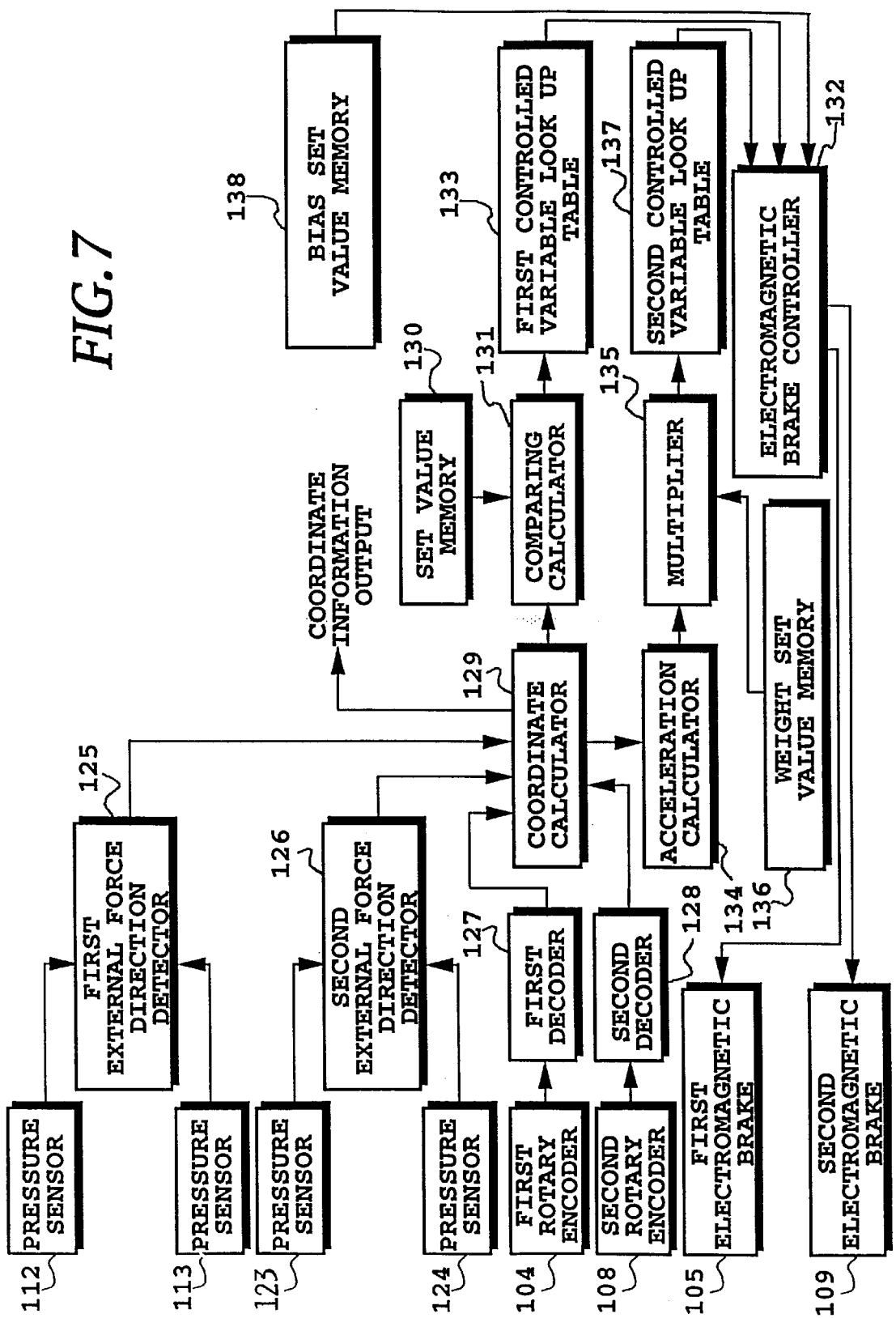
FIG. 7 is a block diagram showing an electrical configuration of the manipulator.

FIG. 7 shows an electrical arrangement of the manipulator in accordance with the present invention. Reference numerals 104, 105, 108, 109, 112 and 113 correspond to those of FIGS. 4 and 6, and reference numerals 123 and 124 designates a pair of pressure sensors mounted on the second rotating axis 110.

A first external force direction detector 125 detects in response to the pressure detection signals of the pair of pressure sensors 112 and 113, the direction of an external force exerted on the first rotating axis 106, that is, the direction in which the positioning operation portion 103 tries to rotate about the first rotating axis 106 by the force applied thereto by the operator, thereby producing a value corresponding to this direction. The value will be described later in more detail.

A second external force direction detector 126 also detects in response to the pressure detection signals from the pair of pressure sensors 123 and 124, the direction of external force exerted on the second rotating axis 110, that is, the direction in which the positioning operation portion 103 tries to rotate about the second rotating axis 110 by the force applied thereto by the operator, thereby producing a value corresponding to this direction.

A first decoder 127 and a second decoder 128 decode the rotation angles with respect to reference positions of the first rotating axis 106 and and the second rotating axis 110 in response to the pulses fed from the first rotary encoder 104 and the second rotary encoder 108 respectively.

A coordinate calculator 129 receives two angle data from the two decoders 127 and 128, and carries out calculations to make correspondence (or coincidence) between the resolution of the coordinate system composed of the inputs and that of the coordinate system required by the device to which the output from the manipulator is input, thereby producing resultant coordinate information. The coordinate calculator 129 also receives signals from the first and second external force direction detectors 125 and 126, which will be described later.

A set value memory 130 stores border coordinates, that is, boundary values between an operable range and an inoperable range (inhibition range or an inhibition angle) of the positioning operation portion 103, in response to operable range information (about the first rotating axis 106 and the second rotating axis 110) set through an input device such as a keyboard.

A comparing calculator 131 compares the border coordinate values in the set value memory 130 with the coordinate information from the coordinate calculator 129, and calculates for each of the first and second rotating axes 106 and 110, an angle D between the coordinates fed from the coordinate calculator 129 and the border coordinates from the coordinate calculator 129 closest to the coordinates.

The reference numeral 132 designates an electromagnetic brake controller, which controls the first electromagnetic brake 105 or the second electromagnetic brake 109 (or both of them at the same time) to produce a braking force or forces in response to the input value.

A first controlled variable look up table 133 converts each of the angles D fed from the comparing calculator 131 into a braking amount of each one of the electromagnetic brakes, and supplies the output to the electromagnetic brake controller 132. There can be various contents of the look up table. One of them outputs "1" when the angle D is zero, and "0" when it is nonzero. In this case, the electromagnetic brake controller 132, receiving the output "1" or "0", controls the electromagnetic brake to stop the shaft thereof when the output is "1", and to release the shaft when the output is "0".

Figure 8:
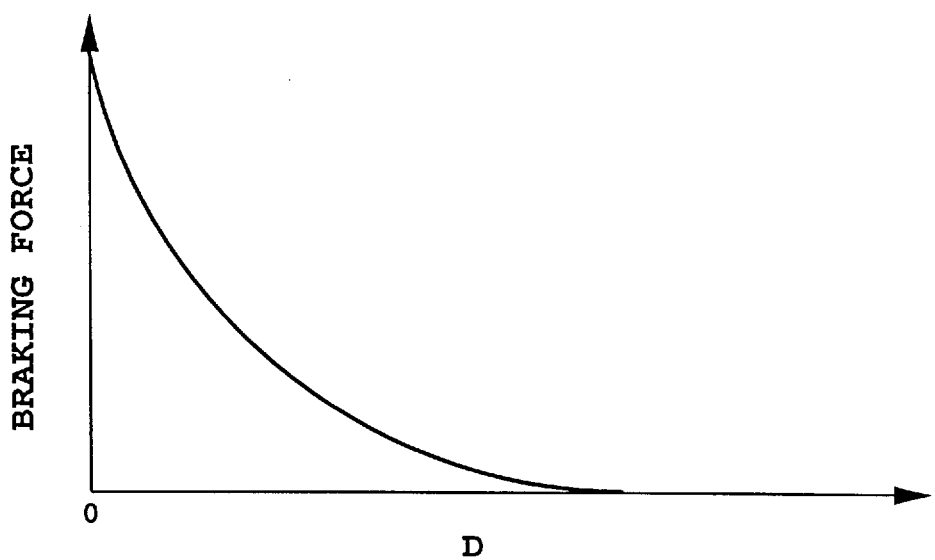
FIG. 8 is a graph illustrating an example of characteristics of data stored in a first controlled variable look up table.
Figure 9:
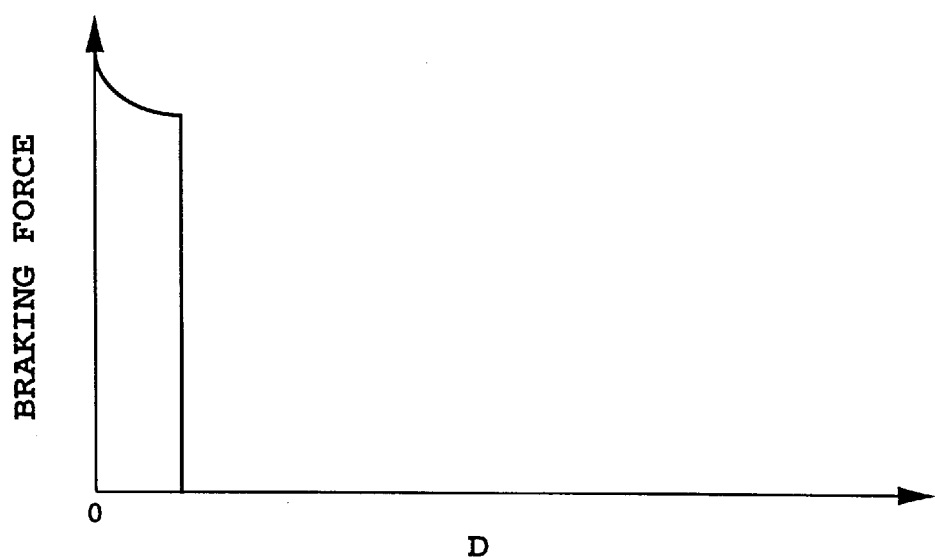
FIG. 9 is a graph illustrating another example of the characteristics of the data stored in the first controlled variable look up table.

Alternatively, the look up tables having characteristics as illustrated in FIGS. 8 and 9 can be used. The look up table of FIG. 8 gradually increases the braking amount as the angle D approaches zero at which it produces a braking amount enough for stopping the shaft of the electromagnetic brake. Thus, the operator experiences greater resistance with the positioning operation portion 103 as it approaches the boundary of the operable range, which enables the operator to recognize (the border of) the operable range of the positioning operation portion 103.

According to the look up table with the characteristics as shown in FIG. 9, the braking force applied on the positioning operation portion 103 is zero to an angle considerably close to the angle D=0, abruptly jumps up to a large braking amount thereat, and further increases until it reaches the angle D=0 at which the shaft stops. In such ways, the contents of the look up table can be set rather freely.

Returning to FIG. 7, an acceleration calculator 134 calculates the acceleration of the first rotating axis 106 and the second rotating axis 110 using the coordinate information fed from the coordinate calculator 129, thereby producing the accelerations of the respective rotations. A multiplier 135 multiplies the accelerations fed from the acceleration calculator 134 by values corresponding to the weight to be perceived by the operator, which values are stored in a weight set value memory 136, thereby producing the resultant product.

A second controlled variable look up table 137 converts the product output from the multiplier 135 into the control amount of the respective electromagnetic brakes, and supplies its resultant output to the electromagnetic brake controller 132.

Figure 10:
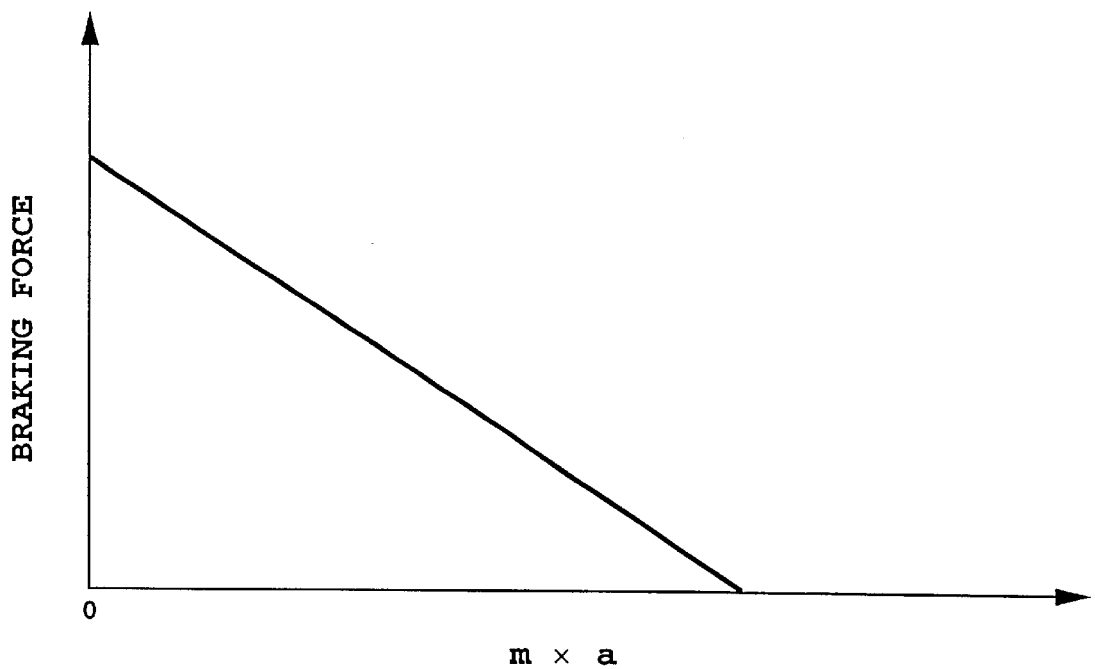
FIG. 10 is a graph illustrating an example of characteristics of data stored in a second controlled variable look up table.

FIG. 10 illustrates an example of the second controlled variable look up table 137. According to the look up table, the braking amount becomes maximum at m*a=0 (at which the positioning operation portion 103 can be moved by the operator rather than stopped), where a is the acceleration fed from the acceleration calculator 134 and m is the weight set value in the weight set value memory 136, and gradually decreases with an increase of m*a. This provides the operator with a resistance of the positioning operation portion 103 corresponding to the weight defined by the value set in the weight set value memory 136 when the operator starts operation of the positioning operation portion 103. Thus, the operator can experience a stronger sense of unity with the operation from the images on the display unit, which are controlled by the coordinate information from the manipulator.

The electromagnetic brake controller 132 receives in parallel the braking amounts of the first rotating axis 106 and the second rotating axis 110 output from the first controlled variable look up table 133, and those output from the second controlled variable look up table 137, and controls the braking of the corresponding electromagnetic brake in response to the greater braking amount between the two inputs. Furthermore, the electromagnetic brake controller 132 controls each of the two electromagnetic brakes 105 and 109 in response to the bias set values about the first rotating axis 106 and the second rotating axis 110 in the bias set value memory 138, which have been set arbitrarily. The outputs from the second controlled variable look up table 137 need not be input to the electromagnetic brake controller 132. Besides, the values in the bias set value memory 138 need not be provided to the electromagnetic brake controller 132. Instead, the bias set value may be set at zero.

The output value from the first external force direction detector 125 is as follows. When the pressure sensor 112 is in the state of detecting the pressure, in which the rotation of the first rotating axis 106 is stopped by the electromagnetic brake 105 after it has rotated in a direction that increases the detection angle of the first decoder, the output value from the first external force direction detector 125 provides the coordinate calculator 129 with information that increases the angle at least of one unit. On the contrary, when the other pressure sensor 113 is in the state of detecting the pressure, in which the rotation of the first rotating axis 106 is stopped by the electromagnetic brake 105 after it has rotated in a direction that decreases the detection angle of the first decoder, the output value from the first external force direction detector 125 provides the coordinate calculator 129 with information that decreases the angle. The second external force direction detector 126 operates in the same manner. The coordinate calculator 129 calculates the coordinate information on the basis of the pulses fed from the first and second rotary decoders 127 and 128, and outputs the sum of the coordinate information and the angle values based on the information output from the first and second external force direction detectors 125 and 126.

Accordingly, when the rotation angle of the first rotating axis 106 increases coordinates while the operator operates the positioning operation portion 103 until it reaches the border, at which it is stopped by the electromagnetic brake 105, and the operator further adds force to the positioning operation portion 103 in the same direction, the first pressure sensor 112 detects the pressure. Although this causes the coordinate calculator 129 to increase the corresponding angle among the coordinate information (that is, the angle exceeds the angle of the border coordinates), the first rotating axis 106 is kept stopped by the electromagnetic brake 105 because the corresponding angle D output from the comparing calculator 131 cannot exceed zero. In contrast, when the operator exerts force on the positioning operation portion 103 in the direction opposite to the foregoing direction, the first pressure sensor 112 turns its state to the nondetection state in which the output value is zero. In this case, the other pressure sensor 113 detects the pressure (because the first rotating axis 106 is being stopped by the electromagnetic brake 105), and its output value is added to the corresponding angle among the coordinate information of the coordinate calculator 129, thereby reducing the angle value below the border value. As a result, the angle D output from the comparing calculator 131 becomes a positive value, which causes the electromagnetic brake 105 to release the first rotating axis 106 from the stopped state, and enables it to be rotated in the direction toward the operable range.

Figure 11:
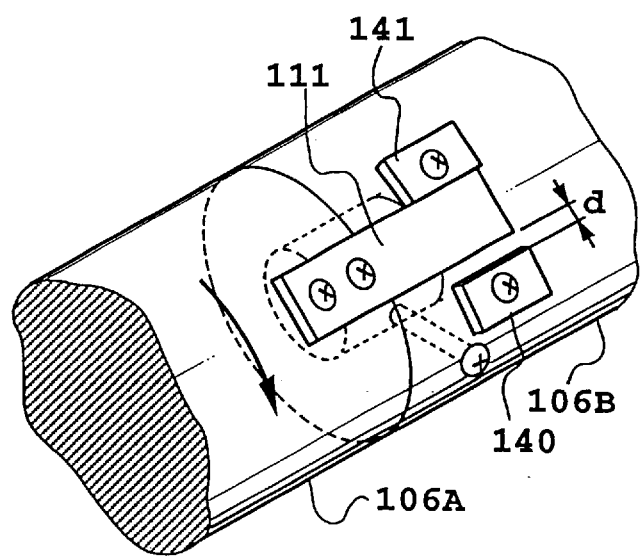
FIG. 11 is a perspective view showing another coupling portion of the first rotating axis.

FIG. 11 shows another example of the coupling portion of the shafts 106A and 106B of the first rotating axis 106 (that of the second rotating axis 110 has the same structure). In this example, a pair of stoppers 140 and 141 are fixed on the shaft 106B instead of the pair of pressure sensors in such a manner that they are placed at both sides of the pressure actuator 111 fixed on the shaft 106A, and that a backlash d is provided in the rotating direction of the shaft. The backlash d is set greater than the resolution of the coordinate information output from the coordinate calculator 129.

With such an arrangement, when the operator operates the positioning operation portion 103 to the border coordinates at which the first rotating axis 106 or the second rotating axis 110 reaches its stopped state by the electromagnetic brake 105 or 109, and then reverses the rotating direction of the shaft, that is, moves the positioning operation portion 103 towards the operable range, the shaft at the rotary encoder side rotates by an amount of the backlash d at the coupling portion. As a result, the output of the decoder connected to the rotary encoder varies, which in turn varies the coordinates output from the coordinate calculator 129, and changes the angle D output from the comparing calculator 131 from zero to plus (+). Then, the stopped state of the corresponding electromagnetic brake is released, thereby enabling the positioning operation portion 103 to be moved towards the operable range.

Figure 12:
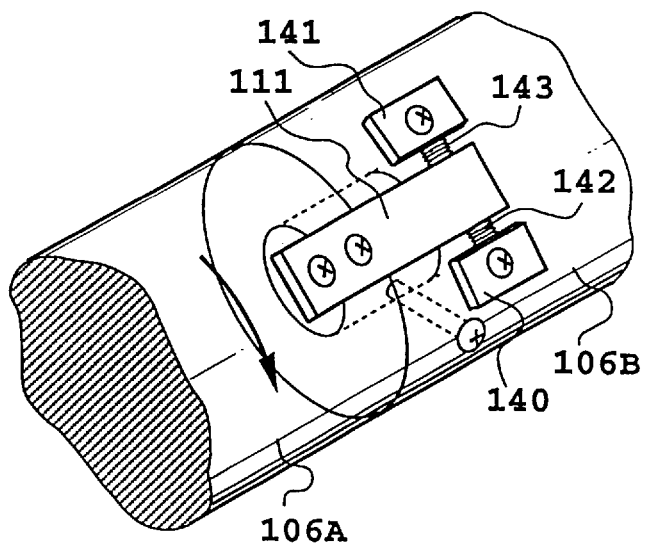
FIG. 12 is a perspective view showing still another coupling portion of the first rotating axis.

FIG. 12 shows still another example of the coupling portion of the shafts 106A and 106B of the first rotating axis 106 (the second rotating axis 110 has the same structure). This example is provided with a pair of springs 142 and 143 connected between the pressure actuator 111 and the pair of stoppers 140 and 141. The pair of springs 142 and 143 cushions the rotation of the first rotating axis 106 while the positioning operation portion 103 is operated. The other operation is the same as that of FIG. 11.

Figure 13:
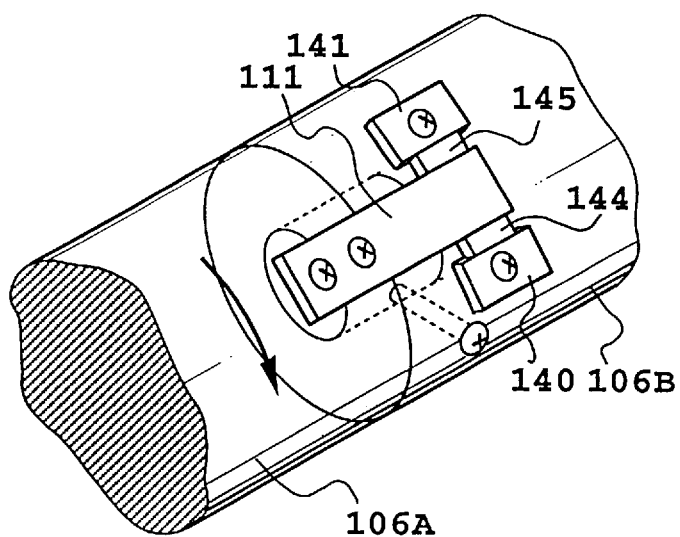
FIG. 13 is a perspective view showing yet another coupling portion of the first rotating axis.

FIG. 13 shows an example which is provided with a pair of rubber chips 144 and 145 instead of the pair of springs. Its operation is the same as that of FIG. 12.

Figure 14:
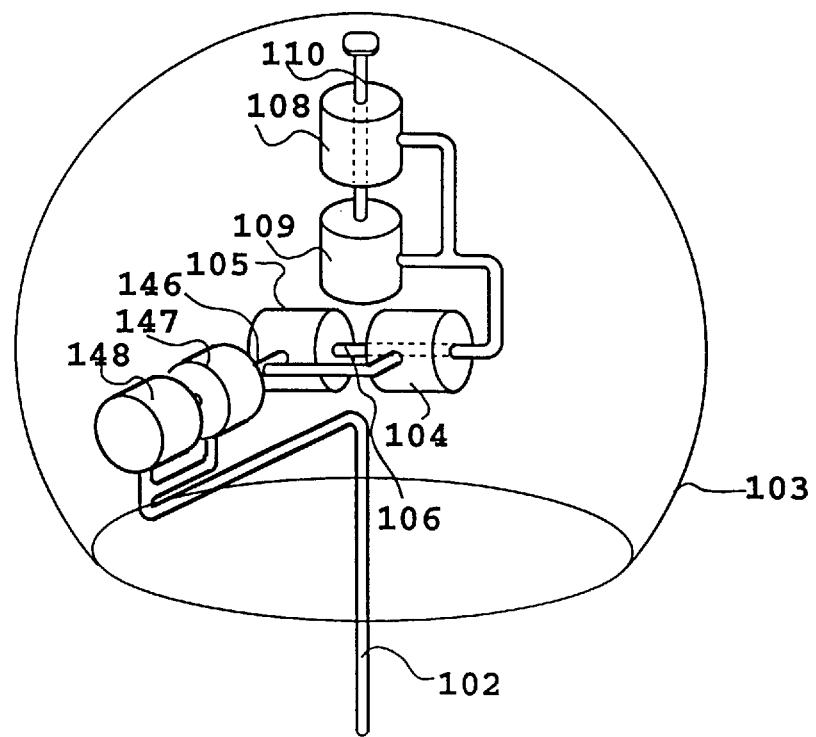
FIG. 14 is perspective view showing a mechanical structure of a manipulator with a third degree of freedom in accordance with the present invention.

FIG. 14 shows an example of a mechanical structure of a manipulator with a third degree of freedom in accordance with the present invention. As shown in this figure, the example is provided with additional third rotating axis 146 besides the first rotating axis 106 and second rotating axis 110 in the variable portion of the support 102. Specifically, a third rotary encoder 147 and a third electromagnetic brake 148 are fixed on the support 102, and the axis thereof constitute the third rotating axis 146. The first rotary encoder 104 and the electromagnetic brake 105 are fixed on the third rotating axis 146 in such a manner that the three axes 106, 110 and 146 are disposed perpendicularly to each other, and pass through the center of the sphere of the positioning operation portion 103.

Since it is easy to understand the electrical configuration of this example which is similar to that of FIG. 7, the description thereof is omitted here.

The present invention includes the following other embodiments.

(1) Besides the rotary encoders, an optical instrument capable of length measurement or a potentiometer can be used as a converter for converting the position indicated by the positioning operation portion into an electric signal.

(2) Besides the pressure sensor, a detector such as a switch, an optical sensor, or an instrument of electric capacity measurement can be used as the external force detector for detecting the movement of the fine joint with restriction on a moving range provided at an intermediate position of the positioning operation portion.

Next, the advantages or merits involved in the implementation of the present invention will now be described.

As described above, the present invention can implement a 3D object graphics display device and a 3D object graphics display method for achieving a virtual-reality-like, interactive 3D object display system in displaying on a 2D display, data of a 3D object read from a database. This is implemented by operating a manipulator, whose operation portion mounted on a fixed portion has at least a second degree of freedom, and which outputs its displacement in terms of length or angle information, and by displaying on the 2D display the image of the 3D object seen from an angle corresponding to the position input through the manipulator (the position indicating the viewpoint) by using the "3D shape data of the 3D object" and the "texture data of the 3D object" prestored in a memory device. This makes it possible to reduce the amount of data stored as the 3D object image data.

In addition, the present invention makes it possible to display images of precious works of art without exhibiting the actual works at a museum or an art gallery, while appreciating them with a feeling of holding them, which can never be expected in the display of the actual works themselves. In particular, since the present invention can display them at a period equal to or less than 1/60 sec, the delay time from the operation to the display can be kept minimum, thereby providing the feeling of holding the actual work.

Moreover, the present invention can be used for building a database of an enormous number of 3D objects as resources.

Furthermore, the present invention can offer a manipulator capable of limiting the operable range of the positioning operation portion to a desired range within its physically operable range.

In addition, the present invention can offer a manipulator which can provide the positioning operation portion with a desired braking force in the operable range. This will improve the operative feeling of a device to which the information from the manipulator is supplied.

Finally, the present invention can offer a manipulator operable with a feeling of holding the object corresponding to the image on a display to which the operator provides the information.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A 3D (three-dimensional) object graphics display device for displaying a 2D (two-dimensional) graphics image by performing image processing on prestored 3D object image data, said 3D objects graphics display device comprising:

a manipulator for outputting position information, said manipulator having at least two degrees of freedom and allowing free rotation; and calculation processing means for generating, when said manipulator indicates a reference position, a 2D image of a 3D object seen from a particular viewpoint, and for generating, when said manipulator points to a position apart from said reference position by a displacement amount, a 2D image of said 3D object seen from a viewpoint shifted by an amount corresponding to said displacement amount, said generating being carried out on the basis of 3D shape data and texture data of said 3D object, which are prestored in a storage as said 3D object image data, said calculation processing means iterating said image generating at a minimum display interval of every 1/60 of a second and completing a 2D display within 1/60 of a second from a beginning of said image generating.

2. The 3D object graphics display device as claimed in claim 1, wherein said manipulator comprises:

a fixed portion;

a positioning operation portion mounted on said fixed portion, said positioning operation portion having two or more degrees of freedom, and being displaced by an external force; and two or more converters each provided in correspondence with each one of said degrees of freedom, for converting displacement amounts on respective axes corresponding to said degrees of freedom into displacement amounts in terms of length or angle, and for outputting said displacement amounts in a form of electric signals.

3. A 3D (three-dimensional) object graphics display method for displaying an image on a 2D (two-dimensional) display by performing image processing on image data prestored in a storage, said 3D object graphics display method comprising the steps of:

generating, when a manipulator indicates a reference position, a 2D image of a 3D object seen from a particular viewpoint, and for generating, when said manipulator points to a position apart from said reference position by a displacement amount, a 2D image of said 3D object seen from a viewpoint shifted by an amount corresponding to said displacement amount, said generating being carried out by using 3D shape data and texture data of said 3D object, which are prestored in said storage as said 3D object image data, said manipulator including a positioning operation portion mounted on a fixed portion, and two or more converters, said positioning operation portion having two or more degrees of freedom, and being displaced by an external force, and said two or more converters being each provided in correspondence with each one of said degrees of freedom, for converting displacement amounts on respective axes corresponding to said degrees of freedom into displacement amounts in terms of length or angle to be output in a form of electric signals;

iterating said image generating in response to position information of said positioning operation portion at every 1/60 sec; and completing display on said 2D display within 1/60 sec from a beginning of said image generating.

4. A manipulator including a positioning operation portion which is mounted on a fixed portion, is displaced by external force, and has two or more degrees of freedom, said manipulator further including two or more converters each provided in correspondence with each one of said degrees of freedom, for converting displacement amounts on respective axes corresponding to said degrees of freedom into displacement amounts in terms of length or angle, and for outputting said displacement amounts in a form of electric signals, said manipulator comprising:

comparing means for comparing a predetermined range with a position indicated by said positioning operation portion, said predetermined range being set in advance within a physically operable range of said positioning operation portion, and said position indicated by said positioning operation portion being calculated from said electric signals representative of said displacement amounts;

a plurality of electromagnetic brakes for limiting an operable range of said positioning operation portion to within said predetermined range in response to an output of said comparing means;

external force detecting means for detecting a direction of said external force exerted on said positioning operation portion when said electromagnetic brakes are locked; and a electromagnetic brake controller for electrically locking said electromagnetic brakes at least on a border of said predetermined range, and for releasing the lock of said electromagnetic brakes when said external force exerted on said positioning operation portion is directed towards an inside of said predetermined range.

5. The manipulator as claimed in claim 4, wherein said positioning operation portion is connected to said converters, and is coupled with said electromagnetic brakes with a backlash being provided at coupling portions, said backlash being equal to or greater than resolution of said converters.

6. The manipulator as claimed in claim 5, wherein said electromagnetic brake controller comprises control means for causing said electromagnetic brakes to generate at least a fixed braking force over an entire region of said predetermined range.

7. The manipulator as claimed in claim 6, wherein said positioning operation portion comprises a spherical shape which rotates about a center of a sphere of 10–30 cm in diameter.

8. The manipulator as claimed in claim 5, wherein said electromagnetic brake controller comprises control means for causing said electromagnetic brakes to generate braking force in inverse proportion to an acceleration of said positioning operation portion, said acceleration being calculated from said electric signals representing displacement amounts in terms of a length or angle within the entire region of said predetermined range.

9. The manipulator as claimed in claim 8, wherein said positioning operation portion comprises a spherical shape which rotates about a center of a sphere of 10–30 cm in diameter.

10. The manipulator as claimed in claim 4, wherein said electromagnetic brake controller comprises control means for increasing braking force of said electromagnetic brakes as the position indicated by said positioning operation portion approaches said border of said predetermined range, within a fixed range near said border, and for locking said electromagnetic brakes electrically on said border of said predetermined range.

11. The manipulator as claimed in claim 10, wherein said electromagnetic brake controller comprises control means for causing said electromagnetic brakes to generate at least a fixed braking force over an entire region of said predetermined range.

12. The manipulator as claimed in claim 11, wherein said positioning operation portion comprises a spherical shape which rotates about a center of a sphere of 10–30 cm in diameter.

13. The manipulator as claimed in claim 10, wherein said electromagnetic brake controller comprises control means for causing said electromagnetic brakes to generate braking force in inverse proportion to an acceleration of said positioning operation portion, said acceleration being calculated from said electric signals representing displacement amounts in terms of a length or angle within the entire region of said predetermined range.

14. The manipulator as claimed in claim 13, wherein said positioning operation portion comprises a spherical shape which rotates about a center of a sphere of 10–30 cm in diameter.

* * * * *